Nov. 23, 1954  B. J. NAUGHTON, JR  2,695,191
WEATHER STRIP ATTACHING MEANS
Filed July 23, 1951
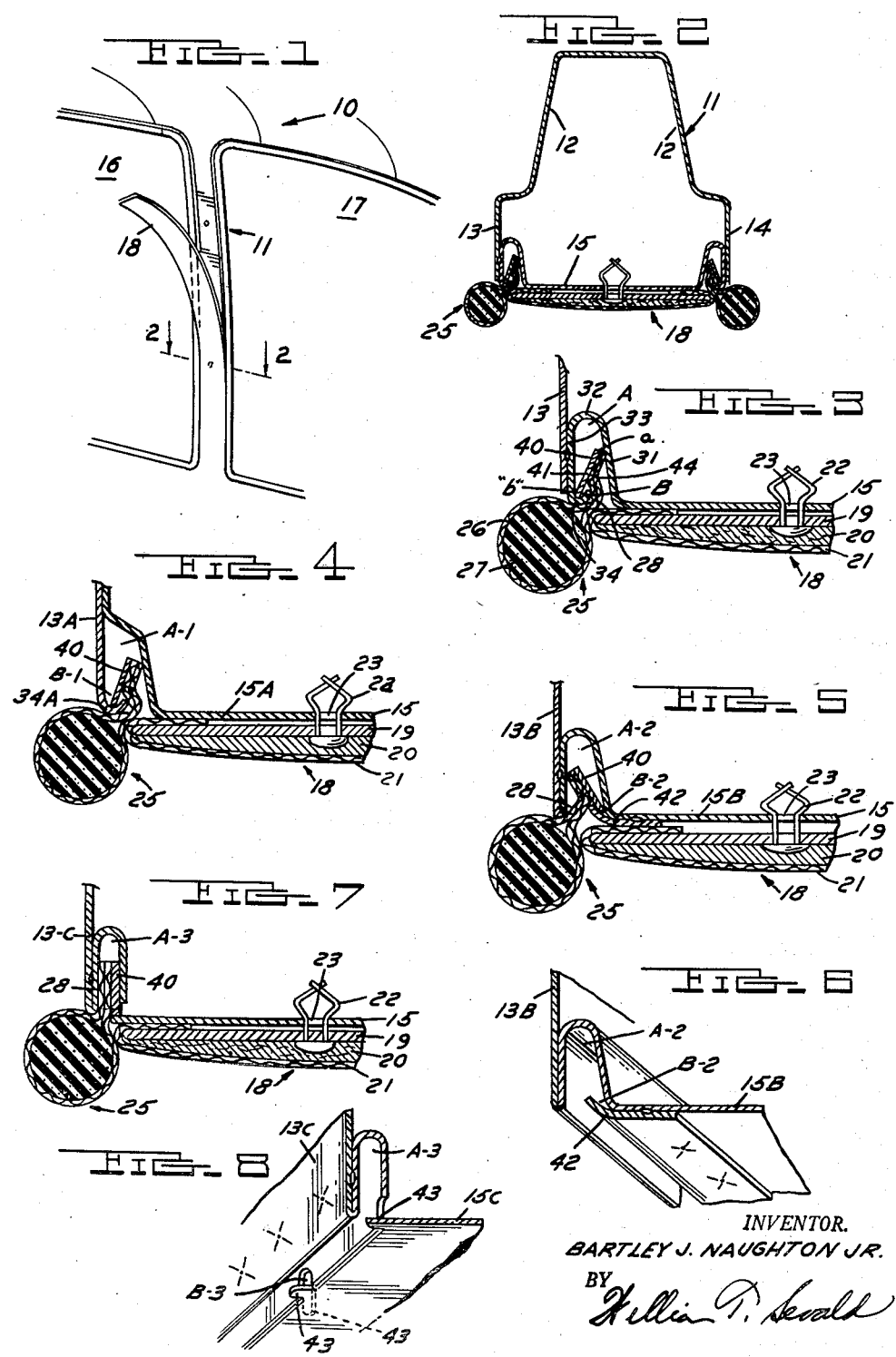
INVENTOR.
BARTLEY J. NAUGHTON JR.
BY
ATTORNEY

United States Patent Office 2,695,191
Patented Nov. 23, 1954

2,695,191

WEATHER STRIP ATTACHING MEANS

Bartley J. Naughton, Jr., Birmingham, Mich., assignor of one-half to Stephen F. Olesak, Detroit, Mich.

Application July 23, 1951, Serial No. 238,041

8 Claims. (Cl. 296—28)

This invention relates to means and methods of attaching fabric weather-stripping around openings defined by sheet metal walls and in particular to a new, novel and inventive wind-hose attachment especially suitable for automobile doors.

Due to mass-production necessary tolerances, the doors of an automobile do not fit with the jambs to sealably prevent the flow of air therebetween caused by wind and vehicle motion. It is necessary, therefore, to add a weather-strip member, known as a "wind-hose" in the industry, to resiliently seal over the space between the door and the jamb to prevent air flowing therebetween. When wood-frame bodies were used, the wind-hose was tacked to the jamb; with the present all-steel body, either nailable material must be added to the jamb or metal fastening means employed to secure the wind-hose as desired.

The present metal fastening means and nailable material methods are unsatisfactory both from a cost standpoint, as they are expensive, and from an engineering, manufacturing, and use standpoint as they do not effect a satisfactory attachment, take too much time and material, and, as they are only secured at spaced intervals, use causes them to pull out at their attachments, become loose, and consequently leak.

With the foregoing statements and other well known facts in view, the primary object of the invention is to provide an improved wind-hose attachment for metal doors and jambs which is cheaper to manufacture, easier and less expensive to install, and more satisfactory, durable, and desirable in use.

An object of the invention is to provide continuous coextensive securing means for the wind-hose.

An object of the invention is to provide a wind-hose anchor-trap utilizing the usual components of the jamb to form same by forming the conventional components to define the trap.

An object of the invention is to provide a wind-hose anchor-trap formable by the addition of a small metal strip or tab projection to the components of the jamb.

An object of the invention is to provide a wind-hose anchor-trap formable by striking out tongues or fingers from the material of the components.

An object of the invention is to provide a new novel method of attaching the wind-hose in automobile manufacture.

An object of the invention is to provide an inexpensive wind-hose anchor easily securable to the wind-hose fabric which requires only the cheapest grade of wind-hose fabric to make and maintain a satisfactory seal.

An object of the invention is to provide a wind-hose anchor-trap easily formable in sheet metal.

These and other objects of the invention will become apparent by reference to the following description of the attaching trap and securing anchor taken in connection with the accompanying drawing showing the devices in conjunction with an automobile center post and doorways as an optional example, in which:

Fig. 1 is an interior, diagrammatic, perspective, partial view of an automobile center-post and door-ways integrated with the inventive trap and anchor.

Fig. 2 is an enlarged cross-sectional view of the center-post of Fig. 1 taken on the line 2—2 thereof.

Fig. 3 is a still further enlarged view, similar to Fig. 2, showing a selected portion of the inventive device in enlarged detail.

Fig. 4 is a view similar to Fig. 3 showing a modification in trap formation.

Fig. 5 is a view similar to Fig. 3 showing another modification of trap formation.

Fig. 6 is a perspective view of the trap device of Fig. 5.

Fig. 7 is a view similar to Fig. 3 showing another modification in trap formation; and Fig. 8 is a perspective view of the trap device of Fig. 7.

Referring now to the drawing wherein like numerals refer to like and corresponding parts throughout the several views of the selected embodiments of the invention optionally shown in conjunction with automobile body-parts wherein the invention comprises means forming a receiving channel, means forming a trap in conjunction with the channel, a wind-hose, a wind-hose anchor disposed in the channel caught behind the trap, a wind-hose, and body trim contacting the wind-hose to position same over the space between the door and jamb and to urge and maintain the anchor and trap in interlocking relationship.

More particularly, Figs. 1 to 3, the body 10 has a hollow center post 11 fabricated from a formed jamb member 12 having two projecting edges 13 and 14, and a cross-support member 15 spanning the edges 13 and 14. The other parts of the body 10 defining the door-ways 16 and 17 are similarly fabricated of parts forming the jamb and a reinforcing member supporting the extending edge. A trim panel member 18 or similar part covers the support member 15 and usually comprises an impregnated card-board backing member 19, padding 20, fabric covering 21, and attaching clips 22 secured to the backing 19 adapted to lock with coacting means 23 on the support 15 to mount the panel 18 on the post 11. The other trim panels surrounding the door-ways 16 and 17 are similarly constructed and attached so that they form the inside shell and trim for the body 10 and, usually, the wind-hose is placed at the sides and top of the doorway only and the bottom sealed with a metal strip. The wind-hose 25 comprises a fabric sleeve 26, a round sponge rubber strip 27 in the sleeve 26, and a tape 28 emanating side-wise from the sleeve 26.

The post cross-support 15 has a longitudinal receiving channel "A" formed along its edge adjacent the post edge 13, Fig. 3, defined by the back portion 31, bridge portion 32, and face portion 33, and a relatively smaller locking channel "B" defined by an inwardly curved extension 34 on the face portion 33 so that channel "B" faces and partially overlaps channel "A." The wind-hose anchor 40, preferably impregnated card-board or fibre board, is sewed intermediate its longitudinal edges, as at 41 to the wind-hose tape 28 to annex the wind-hose 25 to the anchor 40 and the wind-hose body is positioned in extending or sidewise projecting relationship past the edge 13 of the jamb 11 as positioned by the trim panel 18 so as to sealably contact the door, not shown, when in closed relationship with the jamb 11. The anchor 40 lies in the channels "A" and "B" with its longitudinal edge $a$ lying in channel "A" against the sidewalls thereof or bottom as seen in the drawing and with its longitudinal edge $b$ lying in channel "B" against the side walls thereof. As channel "B" opposes channel "A," the anchor strip 40 cannot move out of interlocking relationship therewith as the trim panel 18 prevents upward movement as seen in the drawing of the anchor strip 40 out of channel "B" thereby fixedly integrating the various elements of the device.

The members 31, 32, and 33 define the receiving and positioning channel "A" and the member 34 defines the locking channel "B" with the locking channel "B" in opposed partially overlapping relationship to the receiving channel "A" so that an anchor means 41 can by-pass the locking channel "B" to enter the receiving channel "A" and thereafter be located in the locking channel "B" with the edge portion $b$ of the locking strip 40 abutting the inside of the inwardly curved portion 34 and the edge portions $a$ of the anchor strip 40 cocking against a member 31 in non-extricable condition against a force directed outwardly of the receiving channel.

After the anchor strip 40 is thus positioned in the channels in interlocking relationship, the wind-hose 25 having been previously attached to the anchor strip 40, and with the trim channel 18 abutting the wind-hose 25 preventing, via the wind-hose, inward movement of the anchor strip 40, the strip 40 is thereby secured in interlocking relationship with the channels so that it cannot disassemble without first removal of the trim panel 18.

Referring now to the device of Fig. 4 it will be noted that the curved portion 34A defining the locking channel "B" is formed on the jam-edge 13A while the channel "A–1" is defined by the bent ends of the cross-support 15A of somewhat different configuration than that illustrated in Figs. 2 and 3. However, it will be noted that the channel "A" and channel "B" relationships and the interlocking with the anchor strip 40 is the same as in the previously described embodiment.

Referring now to the device of Figs. 5 and 6, another embodiment of the invention comprises a jamb-edge 13B and a cross-support member 15B curved at its edge portion adjacent the jamb-edge 13B to define the receiving channel A–2 while the locking channel B–2 is defined by a projecting strip 42 inwardly turned relative to channel A–2 mounted on the support member 15B. In this device the anchor strip 40 is used on the opposite side of the wind-hose tape 28, or, the wind-hose tape is reversed from the position seen in the previous figures thereby putting the anchor strip 40 on the opposite side thereof so as to interlock in the channel B–2 as positioned and held by the channel A–2. As in the previous embodiments, the trim panel 18 abutting the wind-hose 25 prevents upward or outward movement of the strip 40 out of the channel B–2 thereby securing the anchor 40 in locked condition in channel B–2.

Referring now to the device of Figs. 7 and 8, the support panel 15C is bent adjacent its edge abutting the jamb-end 13C to define the channel A–3 and tabs 43 are struck or lanced out of the body of the support member 15C to define interrupted individual locking channels B–3 so that the anchor strip 40 can be more closely confined in the channel A–3, if desired, and so that the tabs 43 defining the channels B–3 must be bent downwardly as indicated by the dotted lines of Fig. 8 before the anchor strip 40 can be removed therefrom. In this embodiment of the invention, the anchor strip 40 and the wind-hose tape 28 sewed thereto can be slid end-wise into the channel A–3 in interlocking relationship with the interrupted channels B–3 with the trim panel 18 again pulling the anchor strip 40 to locking engagement with the interrupted channels B–3 via the wind-hose 25 as the trim panel 18 abuts the wind-hose 25 and urges same side-wise outwardly to cover the crack between the jamb 13C and the door lying adjacent thereto, not shown.

In use, the receiving channel A and locking channel B "B" are formed as disclosed by the various embodiments of the invention, or similarly otherwise, so that the anchor strip 40 or similar means is insertable past the structure defining the locking channel B into the receiving channel A together with the wind-hose tape which has been previously stitched, cemented or otherwise attached thereto. After the anchor strip 40 and wind-hose 28 have been thus inserted into the receiving channels, the sleeve 26 portion of the wind-hose 25 is pulled outwardly putting tension along the longitudinally center of the anchor 40 at the stitches 44 thereby cocking the anchor strip 40 in the channel A so that the upper edge a of the strip 40 contacts one side of the means defining channel A thereby driving a longitudinal edge b of the anchor strip 40 into the locking relationship relative to the means defining channels A and B. The wind-hose sleeve portion 26 is then pressed outwardly over the edge of the jamb end 13 and the trim panel 18 is then attached in abutting relationship to the wind-hose sleeve portion 26 thereby securing the trapped relationship of the anchor strip 40 in conjunction with the means defining channels A and B.

It will be noted that in the devices illustrated in Figs. 4 to 8 that the action of mounting and the final integration is identical despite the fact that various members can be conveniently variously formed to define the channels A and B with the channel B lying either on the outside or inside of channel A.

While only a few embodiments of the invention have been shown and described in detail, it is obvious that many changes may be made in the size, shape, detail, and arrangements of the elements of the invention within the scope of the appended claims.

I claim:

1. A weather-strip attaching means comprising, a first channel member defining a receiving channel, a second channel member defining a locking channel associated with said first member so as to overlap the locking channel on the receiving channel in opposed relationship, a sealing element disposed adjacent said channel, a tape on said element extending past said locking channel into said receiving channel, a rigid anchor strip stitched to said tape disposed in said receiving channel with its outer edge in said locking channel and its inner edge cocked against the far side of said receiving channel so as to be inextricable therefrom while in this condition, and a trim panel abutting said sealing element so as to position said sealing element in a desired location and to hold said anchor strip with its outer edge in said locking channel via said tape to prevent said anchor strip moving out of said locking channel thereby securing said sealing element via said tape.

2. In a device as set forth in claim 1, said anchor strip being easily removed from said channels by first removing said trim panel, second, moving the outer edge of said anchor strip inwardly out of said locking channel and, third, by moving said anchor strip outwardly past said locking channel.

3. A wind-hose mounting and attaching combination particularly suitable for automobile body integration comprising a longitudinal channel member having a longitudinal opening defining a receiving channel, a longitudinal catch member overlapping the opening of said channel member at a point adjacent the top thereof defining a locking channel, a wind-hose member suited to block a crevice to be stopped, a longitudinal relatively flexible tape extension member on said wind-base leading sidewise therefrom adapted to lie in said channel member, a relatively inflexible longitudinal strip member wider than the width of said channel member cocked against the sides of said channel member with its outer edge caught under said catch member, and longitudinal stitching securing said tape and strip together.

4. A wind-hose mounting and attaching combination particularly suitable for automobile body integration comprising a longitudinal channel member having a longitudinal opening defining a receiving channel, a longitudinal catch member overlapping the opening of said channel member at a point adjacent the top thereof defining a locking channel, a wind-hose member suited to block a crevice to be stopped, a longitudinal relatively flexible tape extension member on said wind-hose leading sidewise therefrom adapted to lie in said channel member, a relatively inflexible longitudinal, strip member wider than the width of said channel member cocked against the sides of said channel member with its outer edge caught under said catch member, and longitudinal stitching securing said tape and strip together, and a trim panel member abutting said wind-hose member so as to position said tape member to hold said strip member cocked in said channel member with its edge under said catch member.

5. A weather-strip attaching combination comprising an elongated sealing element, an elongated relatively flexible tape emanating sidewise from said element, an elongated relatively inflexible anchor strip imposed on said tape and stitched to said tape on a longitudinal line spaced from the edge of said strip adjacent said element so that the edge of said tape adjacent said element can move away from the edge of said anchor strip adjacent said element and vice-versa, a receiving channel receiving said tape and said strip and so proportioned as to be laterally narrower than the lateral dimension of said anchor strip, and a locking channel disposed in opposed overlapping relationship to said receiving channel so that movement of said tape and said strip out of said receiving channel exerts a tipping force on said strip thereby positioning the outer edge of said strip in said locking channel and cocking the inner edge of said strip against the far side of said receiving channel relative to said locking channel whereby further outward movement of said tape is prohibited by said anchor strip being tipped and jammed between said channels.

6. In a device as set forth in claim 5, a trim panel bearing against said element preventing movement of said element into said channels, said tape, and said trim panel thereby maintaining said anchor strip in tipped and jammed, securing relationship in said channels thereby fastening said element.

7. Windhose attaching and securing means comprising a door jamb having one edge thereof forming a receiving channel, a locking channel adjacent the mouth of said receiving channel arranged in opposed relation to said receiving channel, and a flexible windhose having a strip less flexible than said windhose connected thereto intermediate the edges of said strip, said strip being disposed between said receiving channel and said locking channel with one edge seated in said locking channel, said strip being wider than the width of said receiving channel whereby a pull on said windhose is transmitted to said strip via the connection of said windhose and said strip to pivot and cock said strip with one edge thereof in said locking channel and with the other edge thereof in abutting relation with a wall of said receiving channel to prevent removal of said strip from said channels.

8. Windhose attaching means as set forth in claim 7, including a trim panel secured to said jamb, an edge of said panel lying between said windhose and said channels in abutting relation to said windhose to prevent movement of said windhose toward said channels.

References Cited in the file of this patent

UNITED STATES PATENTS

| Number | Name | Date |
| --- | --- | --- |
| Re. 19,416 | McCormick | Jan. 8, 1935 |
| 1,896,632 | Ledwinka | Feb. 7, 1933 |
| 2,051,757 | Travis | Aug. 18, 1936 |
| 2,406,629 | Petkwitz | Aug. 27, 1946 |